(12) United States Patent
Seaton et al.

(10) Patent No.: US 11,645,467 B2
(45) Date of Patent: May 9, 2023

(54) TRAINING A SYSTEM TO PERFORM A TASK WITH MULTIPLE SPECIFIC STEPS GIVEN A GENERAL NATURAL LANGUAGE COMMAND

(71) Applicant: Functionize, Inc., Walnut Creek, CA (US)

(72) Inventors: Jonathon R. Seaton, Walnut Creek, CA (US); Tamas Cser, Walnut Creek, CA (US)

(73) Assignee: Functionize, Inc., Walnut Creek, CA (US)

(*) Notice: Subject to any disclaimer, the term of this patent is extended or adjusted under 35 U.S.C. 154(b) by 368 days.

(21) Appl. No.: 16/595,356

(22) Filed: Oct. 7, 2019

(65) Prior Publication Data
US 2020/0234084 A1    Jul. 23, 2020

Related U.S. Application Data

(60) Provisional application No. 62/715,222, filed on Aug. 6, 2018.

(51) Int. Cl.
*G06F 40/295* (2020.01)
*G06F 17/16* (2006.01)
(Continued)

(52) U.S. Cl.
CPC ............ *G06F 40/295* (2020.01); *G06F 17/16* (2013.01); *G06F 18/2148* (2023.01);
(Continued)

(58) Field of Classification Search
CPC .. G06K 9/6263; G06K 9/6202; G06K 9/6257; G06F 17/15; G06F 3/167;
(Continued)

(56) References Cited

U.S. PATENT DOCUMENTS 5,335,342 A    8/1994   Pope et al.
6,662,312 B1   12/2003  Keller et al.
(Continued)

FOREIGN PATENT DOCUMENTS

CN   103995775 A   8/2014
CN   106201898 B   12/2018
(Continued)

*Primary Examiner* — Asghar H Bilgrami
(74) *Attorney, Agent, or Firm* — Casimir Jones S.C.; Thomas A. Isenbarger

(57) ABSTRACT

A system for performing a task with multiple specific steps given a general natural language command. The system includes an electronic processor. The electronic processor is configured to receive a general natural language command specifying a task to perform and, using a first machine learning system, generate a plurality of specific steps associated with the general natural language command. The electronic processor is also configured to, using the plurality of specific steps and a second machine learning system, perform the task, determine whether the task is performed successfully, and, when the task is not performed successfully, retrain the first machine learning system, second machine learning system, or both.

15 Claims, 11 Drawing Sheets

(51) Int. Cl.
*G06N 20/00* (2019.01)
*H04L 67/50* (2022.01)
*G06F 3/16* (2006.01)
*G06N 20/20* (2019.01)
*G06F 40/205* (2020.01)
*G06F 40/284* (2020.01)
*G06F 18/21* (2023.01)
*G06F 18/214* (2023.01)

(52) U.S. Cl.
CPC ......... *G06F 18/2178* (2023.01); *G06N 20/00* (2019.01); *H04L 67/535* (2022.05)

(58) Field of Classification Search
CPC .... G06F 40/284; G06F 40/205; G06F 40/295; G06N 20/00; G06N 5/003; G06N 7/005; G06N 20/20; G06N 3/0454; G06N 3/084; H04L 67/22
See application file for complete search history.

(56) References Cited

U.S. PATENT DOCUMENTS

| | | | |
|---|---|---|---|
| 7,020,797 B2 | 3/2006 | Patil | |
| 7,373,636 B2 | 5/2008 | Barry et al. | |
| 8,276,123 B1 | 9/2012 | Deng et al. | |
| 8,683,447 B2 | 3/2014 | Miller | |
| 8,887,135 B2 | 11/2014 | Banerjee et al. | |
| 8,924,938 B2 | 12/2014 | Chang et al. | |
| 9,038,026 B2 | 5/2015 | Chandra et al. | |
| 9,720,815 B2 | 8/2017 | Champlin-Scharff et al. | |
| 10,162,850 B1 * | 12/2018 | Jain | G06F 16/93 |
| 10,559,225 B1 * | 2/2020 | Tao | G10L 15/16 |
| 10,784,000 B2 * | 9/2020 | Wu | G06N 3/0454 |
| 11,042,784 B2 * | 6/2021 | Jelveh | G06K 9/6263 |
| 11,086,741 B2 * | 8/2021 | Zhang | G06F 3/167 |
| 11,093,882 B2 * | 8/2021 | Rotta | G06Q 10/06375 |
| 11,107,470 B2 * | 8/2021 | Ward | G10L 15/1822 |
| 11,132,499 B2 * | 9/2021 | Liang | G10L 15/183 |
| 11,147,636 B2 * | 10/2021 | Hallen | A61B 34/25 |
| 11,195,122 B2 * | 12/2021 | Jaiswal | H04L 67/26 |
| 2011/0202901 A1 | 8/2011 | Giovani et al. | |
| 2011/0276944 A1 | 11/2011 | Bergman et al. | |
| 2015/0082280 A1 | 3/2015 | Betak et al. | |
| 2016/0132426 A1 | 5/2016 | Crawshay et al. | |
| 2016/0210225 A1 | 7/2016 | Champlin-Scharff et al. | |
| 2017/0024310 A1 | 1/2017 | Andrejko et al. | |
| 2017/0262359 A1 | 9/2017 | Agrawal | |
| 2017/0262360 A1 | 9/2017 | Kochura et al. | |
| 2019/0066660 A1 * | 2/2019 | Liang | G06F 16/3329 |
| 2019/0213115 A1 | 7/2019 | Takawale et al. | |
| 2019/0287685 A1 * | 9/2019 | Wu | G06F 40/30 |
| 2020/0168208 A1 * | 5/2020 | Mitra | G10L 15/02 |

FOREIGN PATENT DOCUMENTS

| | | |
|---|---|---|
| CN | 110209586 A | 9/2019 |
| WO | 2007053634 A2 | 5/2007 |
| WO | 2015118536 A1 | 8/2015 |

* cited by examiner

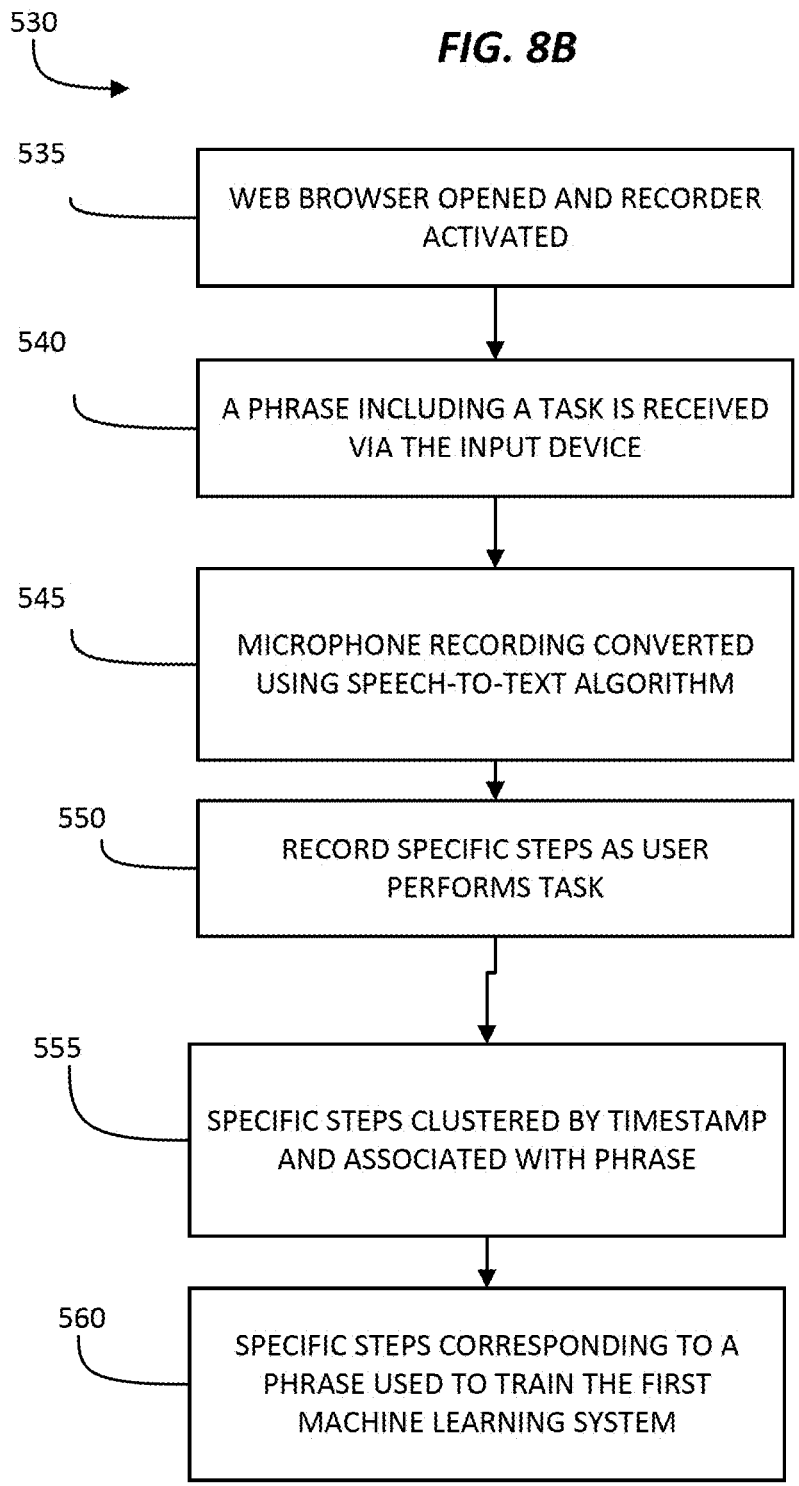

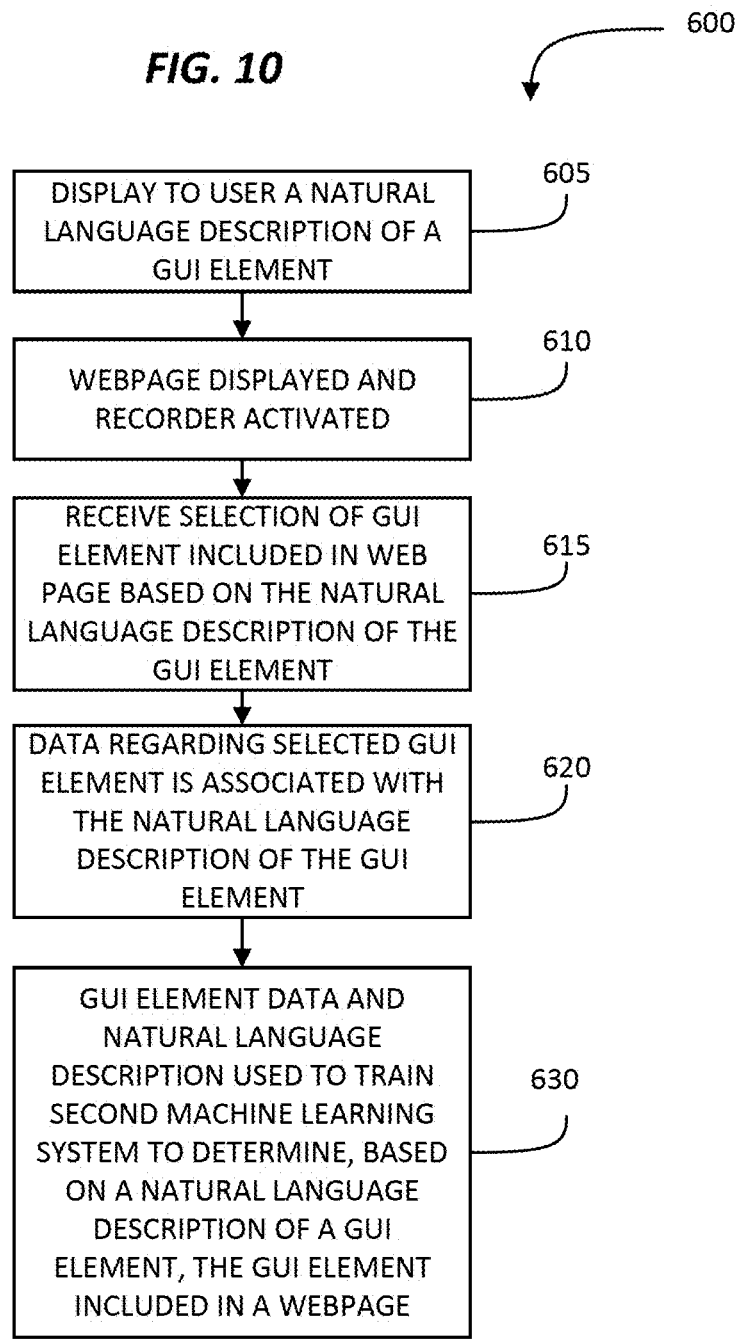

TRAINING A SYSTEM TO PERFORM A TASK WITH MULTIPLE SPECIFIC STEPS GIVEN A GENERAL NATURAL LANGUAGE COMMAND

RELATED APPLICATIONS

This application claims priority to U.S. Provisional Patent Application No. 62/715,222, filed Aug. 6, 2018, the entire content of which is hereby incorporated by reference.

SUMMARY

When a user wants to perform an overall task online or otherwise interact with a computer system, the user often has to perform several steps (sometimes routine and mundane) in order to perform the task. In one example, when a user wishes to log into their email account, the user may have to enter their user name, enter their password, and select a "submit" GUI button included in a web page. In another example, when a user wishes to purchase an item on an e-commerce web site, the user may have to select a GUI element to go their cart, enter their credit card information, enter their address, and select a GUI element to confirm the purchase. It would save a user a significant amount of time and effort if the user could input to an electronic user device a general natural language command specifying a web based task and, in response, the electronic user device determined steps involved in performing the task and performed the task specified by the general natural language command.

Therefore, embodiments described herein provide, among other things, a system and a method for training a system to perform a task with multiple specific steps given or in response to a general natural language command. It should be understood, that in the context described herein "specific step(s)" refers to steps that are performed to accomplish an overall tasks. The steps are specific in the context of achieving and in comparison to an overall task, but they are not necessarily required or special.

In some embodiments, the system for performing the task generates a series of specific steps from the general natural language command. For example, the general language command may be "purchase the items in my cart at website X and ship to home" and the specific steps may be "select cart icon," "enter credit card info," "enter street address," and "select confirmation button." The user device then performs an action for each specific step based on GUI elements included in a webpage. The system for performing the task may utilize a plurality of machine learning systems. For example, the system for performing the task may use a first machine learning system to determine the plurality of specific steps given the general natural language command and use a second machine learning system to determine how to perform each specific step based on a currently accessed webpage.

According to some embodiments described herein, the first machine learning system and the second machine learning system are trained using training data gathered from a plurality of users. The training data may be gathered from users by presenting users with a prompt and recording the actions a user takes based on the prompt. For example, a prompt may ask the user to "select a like button" on a specific webpage and the button that the user selects based on the prompt may be recorded. In another example, a user may be presented with a prompt stating "please log in to your account" on a specific webpage and the actions that the user takes to log in to their account may be recorded.

One embodiment provides a system for performing a task with multiple specific steps given a general natural language command. The system includes an electronic processor. The electronic processor is configured to receive a general natural language command specifying a task to perform and, using a first machine learning system, generate a plurality of specific steps associated with the general natural language command. The electronic processor is also configured to, using the plurality of specific steps and a second machine learning system, perform the task, determine whether the task is performed successfully, and, when the task is not performed successfully, retrain the first machine learning system, second machine learning system, or both.

Another embodiment provides a method for performing a task with multiple specific steps given a general natural language command. The method includes receiving a general natural language command specifying a task to perform and, using a first machine learning system, generating a plurality of specific steps associated with the general natural language command. The method also includes performing, using the plurality of specific steps and a second machine learning system, the task, determining whether the task is performed successfully, and, when the task is not performed successfully, retraining the first machine learning system, second machine learning system, or both.

Other aspects, features, and embodiments will become apparent by consideration of the detailed description and accompanying drawings.

BRIEF DESCRIPTION OF THE DRAWINGS

FIGS. 8A and 8B are example flowcharts of methods for training a first machine learning system of the system of FIG. 1 according to some embodiments.

FIG. 10 is an example flowchart of a method for training the second machine learning system of the system of FIG. 1 according to some embodiments.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
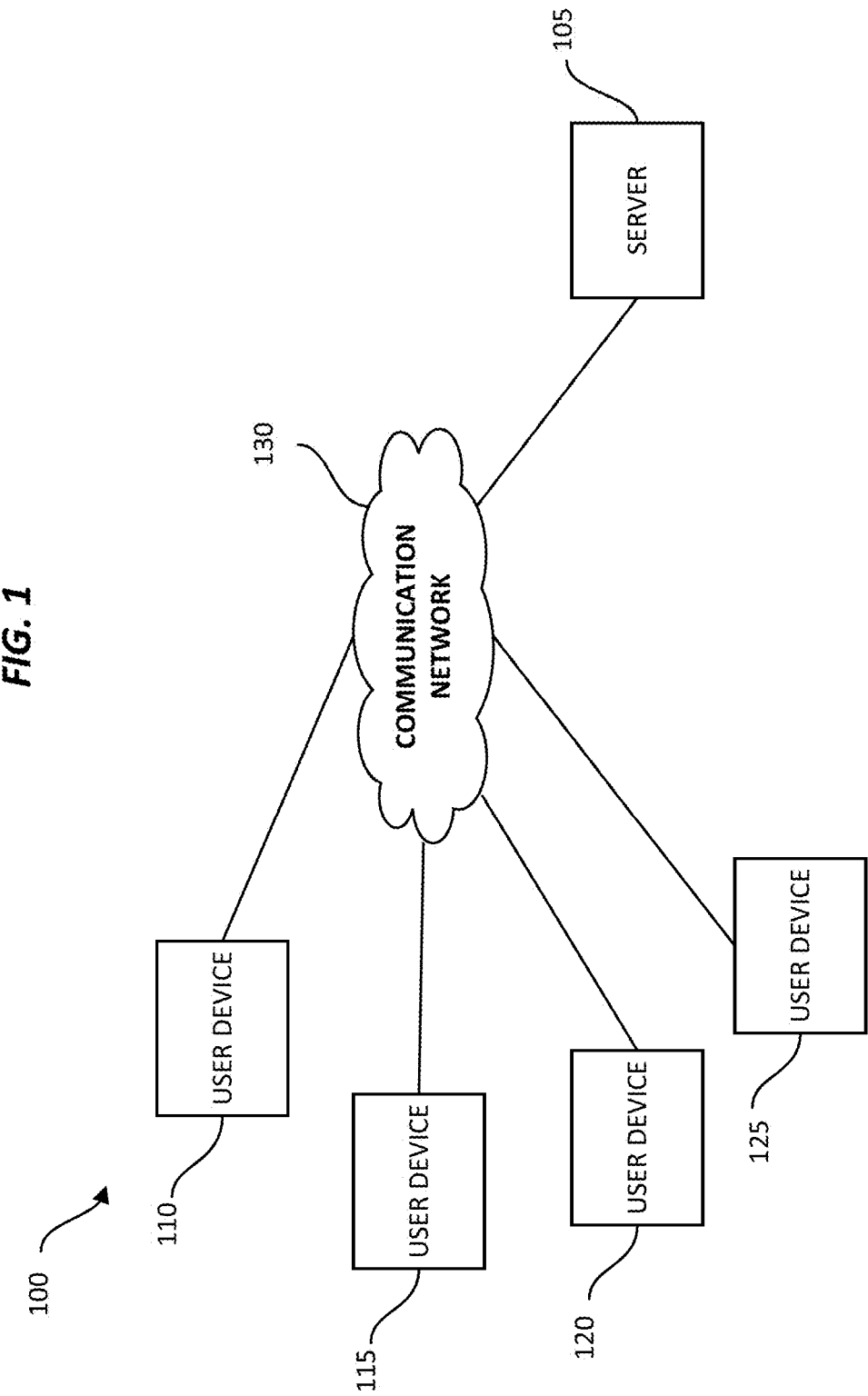
FIG. 1 is a block diagram of an example system for training a system to perform a task with multiple specific steps given a general natural language command according to some embodiments.

FIG. 1 illustrates an example system 100 for training a system to perform a task with multiple specific steps given or in response to a general natural language command. The system 100 illustrated in FIG. 1 includes a server 105 and one or more user devices 110, 115, 120, 125. The server 105 and the user devices 110, 115, 120, 125 communicate over one or more wired or wireless communication networks 130. Portions of the wireless communication networks 130 may be implemented using a wide area network, for example, the Internet, a local area network, for example, a Bluetooth™ network or Wi-Fi, and combinations or derivatives thereof. It should be understood that the server 105 may communicate with any number of user devices, and the four user devices 110, 115, 120, 125 illustrated in FIG. 1 are purely for illustrative purposes. Similarly, it should also be understood that the system 100 may include any number of servers and the single server 105 illustrated in FIG. 1 is purely for illustrative purposes. Also, in some embodiments, one of the user devices 110, 115, 120, 125 may communicate with the server 105 through one or more intermediary devices (not shown).

Figure 2:
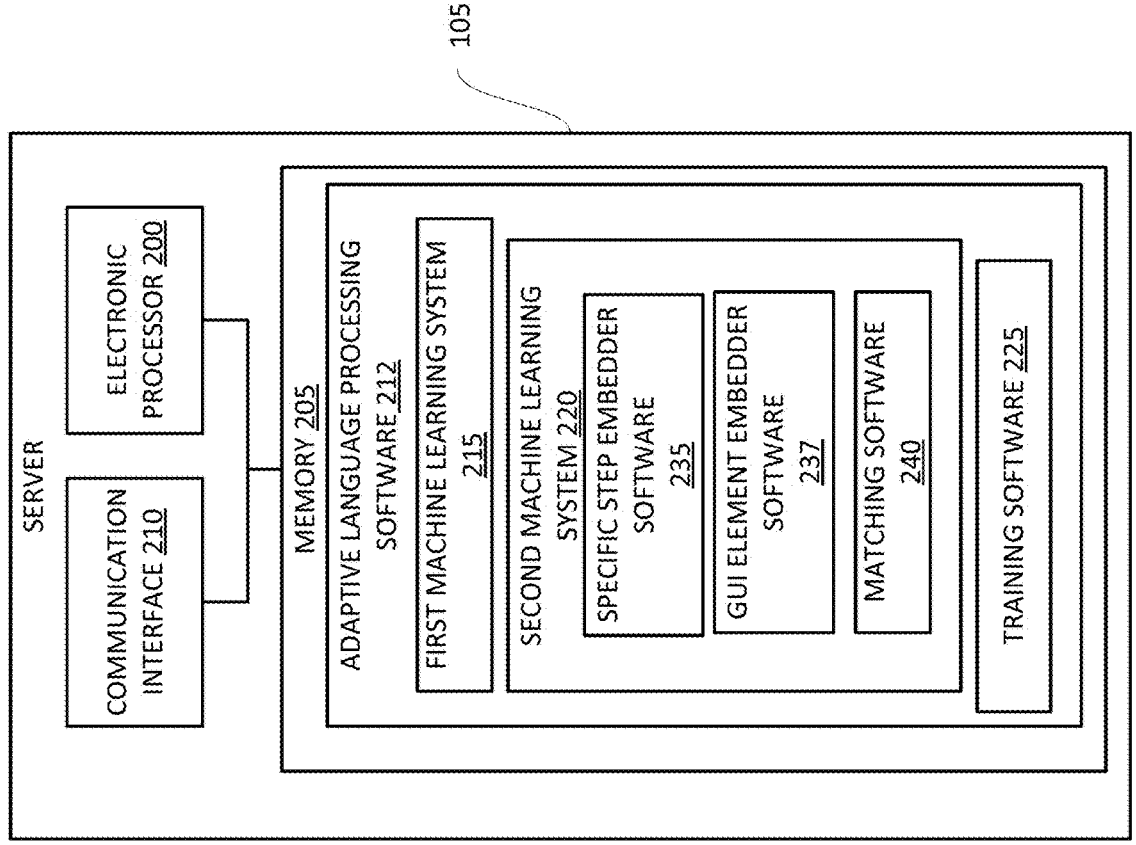
FIG. 2 is a block diagram of an example server included in the system of FIG. 1.

FIG. 2 schematically illustrates the server 105 according to some embodiments. As illustrated in FIG. 2, the server 105 is an electronic computing device that includes an electronic processor 200 (for example, a microprocessor, application-specific integrated circuit (ASIC), or another suitable electronic device), a memory 205 (a non-transitory, computer-readable storage medium), and a communication interface 210, for example, a transceiver, for communicating over the communication network(s) 130 and, optionally, one or more additional communication networks or connections. The electronic processor 200, the memory 205, and the communication interface 210 communicate wirelessly, over one or more communication lines or buses, or a combination thereof. It should be understood that the server 105 may include additional components than those illustrated in FIG. 2 in various configurations and may perform additional functionality than the functionality described herein. Furthermore, the functionality described herein as being performed by the server 105 may be performed in a distributed nature via a plurality of servers or similar devices included in a cloud computing environment.

As illustrated in FIG. 2, the memory 205 included in the server 105 includes adaptive language processing (ALP) software 212. The ALP software 212 includes a first machine learning system 215, a second machine learning system 220, and training software 225. In some embodiments, the second machine learning system 220 includes a specific step embedder software 235, GUI element embedder software 237, and matching software 240. In some embodiments, the specific step embedder software 235, GUI element embedder software 237, and matching software 240 include computer readable instructions for processing input to or output from the neural network. In some embodiments, the second machine learning system 220 may include one or more machine learning models. For example, the second machine learning system 220, may include a neural network, a random forest, a support vector machine, a probabilistic graphical model, a decision tree, a Bayesian network, a linear classifier, a combination of the foregoing, or the like. In some embodiments, the first machine learning system 215 also includes one or more machine learning models. For example, the first machine learning system 215, may include a neural network, a random forest, a support vector machine, a probabilistic graphical model, a decision tree, a Bayesian network, a linear classifier, a combination of the foregoing, and the like. When executed by the electronic processor 200, the ALP software 212 performs a set of functions, including the methods described herein. For example, as described in more detail below, the ALP software 212 performs a multi-step task based on a general natural language command. It should be understood that the functionality described herein as being performed by the ALP software 212 may be distributed among multiple applications or software components.

In some embodiments, the server 105 is configured (through execution of one or more software applications by the electronic processor 200) to provide at least some of the functionality described herein as being performed by the user device 110.

Figure 3:
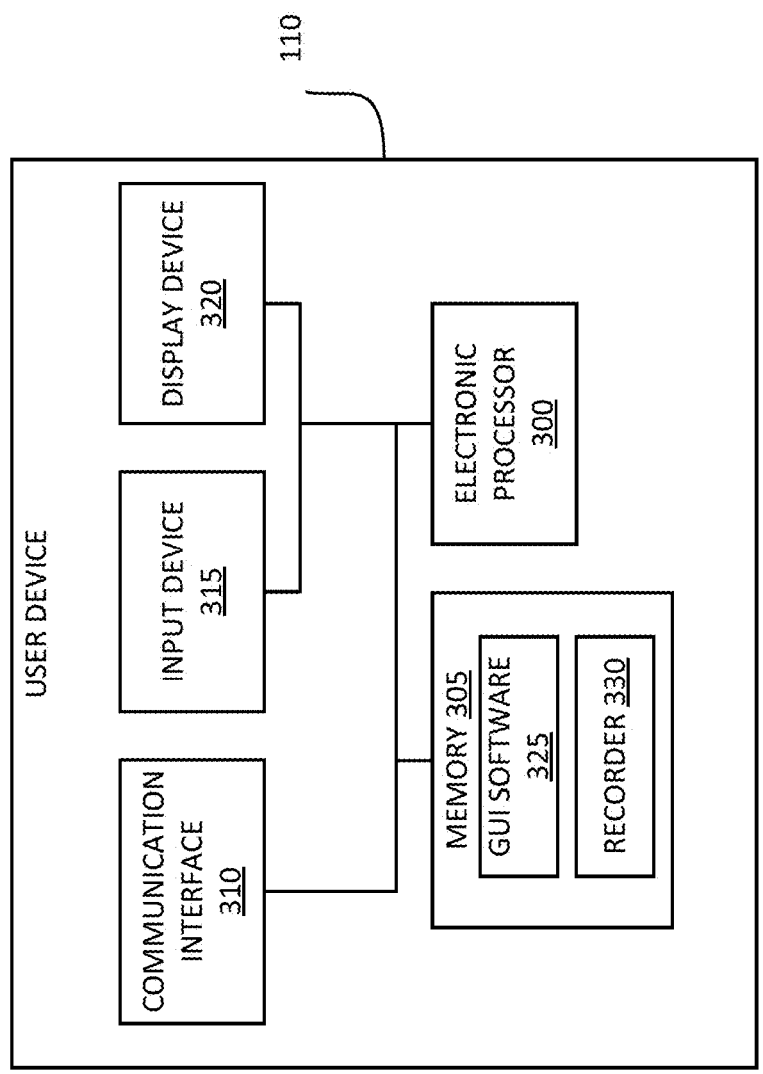
FIG. 3 is a block diagram of an example user device included in the system of FIG. 1.

FIG. 3 schematically illustrates the user device 110 according to some embodiments. The user device 110 may be a laptop or desktop computer, a tablet computer, smart phone, or other computing device. As illustrated in FIG. 3, the user device 110 is electronic computing device that includes an electronic processor 300 (for example, a microprocessor, application-specific integrated circuit (ASIC), or another suitable electronic device), a memory 305 (a non-transitory, computer-readable storage medium), and a communication interface 310, for example, a transceiver, for communicating over the communication network(s) 130 and, optionally, one or more additional communication networks or connections. The communication interface 310 allows the user device 110 to communicate with the server 105 over the communication network(s) 130.

The user device 110 also includes an input device 315 and a display device 320. The display device 320 may include, for example, a touchscreen, a liquid crystal display ("LCD"), a light-emitting diode ("LED"), a LED display, an organic LED ("OLED") display, an electroluminescent display ("ELD"), and the like. The input device 315 may include, for example, a keypad, a mouse, a touchscreen (for example, as part of the display device 320), a microphone, a camera, or the like (not shown). The electronic processor 300, the memory 305, the communication interface 310, the input device 315, and the display device 320 communicate wirelessly, over one or more communication lines or buses, or a combination thereof. It should be understood that the user device 110 may include additional components than those illustrated in FIG. 3 in various configurations and may perform additional functionality than the functionality described herein. For example, in some embodiments, the user device 110 includes multiple electronic processors, multiple memories, multiple communication interfaces, multiple input devices, multiple output devices, or a combination thereof. Also, it should be understood that, although not described or illustrated herein, the user devices 115, 120, 125 may include similar components and perform similar functionality as the user device 110.

As illustrated in FIG. 3, the memory 305 included in the user device 110 includes GUI software 325 and a recorder 330. When executed by the electronic processor 300 in coordination with a software application (for example, a web based software application or a web browser), the GUI software 325 presents a GUI on the display device 320. The GUI includes one or more GUI elements. GUI elements may include a window, a tab, a checkbox, a radio button, a drop down list, a list box, a dropdown button, a toggle, a text field, a visual button, a search field, a slider, a combination of the foregoing, and the like. It should be understood that the functionality described herein as being performed by the GUI software 325 and recorder 330 may be distributed among multiple applications or software components.

In some embodiments, the user device 110 is configured (through execution of one or more software applications by the electronic processor 300) to provide at least some of the functionality described herein as being performed by the server 105.

Figure 4:
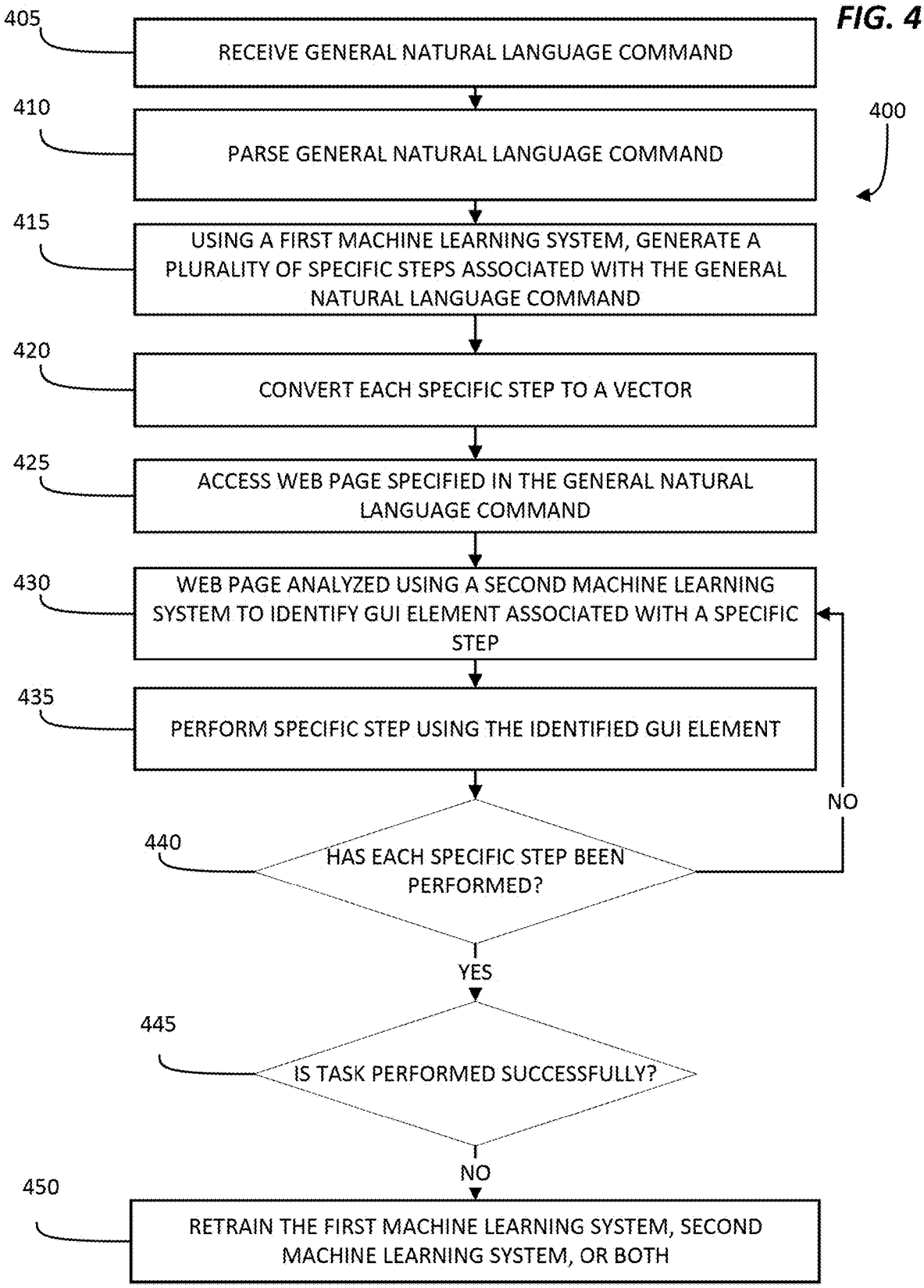
FIG. 4 is an example flowchart of a method for using the system of FIG. 1 to train a system to perform a task with multiple specific steps given a general natural language command according to some embodiments.

FIG. 4 includes an example method 400 for training a system to perform a task with multiple specific steps given a general natural language command. The method 400 begins at block 405 when the electronic processor 200 receives a general natural language command. For example, the electronic processor 200 may receive the general natural language command from a user device 110 via the communication network 130. The general natural language command may include an indication of a webpage. The general natural language command may be, for example, "Go to the website X and order a gift to a delivery address." At block 410, the electronic processor 200 parses the general natural language command into one or more phrases, each phrase specifying a task. In some embodiments, a named entity recognition (NER) model, part of speech tagging (POS) model, or both are used to parse the general natural language command to identify actions, GUI elements, and data values included in the general natural language command. For example, the electronic processor 200 may determine that the first task to perform is access website X and the second task to be performed is order a gift to a delivery address.

At block 415, the electronic processor 200 uses a first machine learning system (for example, the first machine learning system 215) to generate a plurality of specific steps associated with the general natural language command. For example, given the general natural language command "Go to the website X and order a gift to a delivery address," the electronic processor 200 may determine the specific steps to be "go to website X," "enter the gift into a text field associated with searching," "select search button," "select the gift from the search results," "select add to shopping cart button," "select check out button," "enter credit card information into text fields under header" "Credit Card Information"," "enter delivery address into text fields under header "Delivery Address"," and "select confirm purchase button." In some embodiments, each specific step includes an action and one or more GUI elements associated with the action. In some embodiments, each phrase is analyzed by the first machine learning system 215 to produce a plurality of specific steps associated with the phrase. For example, the general natural language command may be "go to website, login as John Doe, and like John Smith's wedding photos" and the electronic processor 200 may parse the general natural language command into three phrases ("go to website," "login as John Doe," and "like John Smith's wedding photos"). The first machine learning system 215 determines a plurality of specific instructions for each of the three phrases separately. For example, the first machine learning system 215 may receive "like John Smith's wedding photos" as input and generate a plurality of specific steps associated with liking John Smith's wedding photos. In some embodiments, the phrases are converted to a different format than natural language (for example, markup language) before the electronic processor 300 analyzes them with the first machine learning system 215. It should be understood that, while the embodiments herein describe phrases and specific steps being in markup language, the phrases and specific steps may be represented in other formats, for example, machine code.

Figure 5:
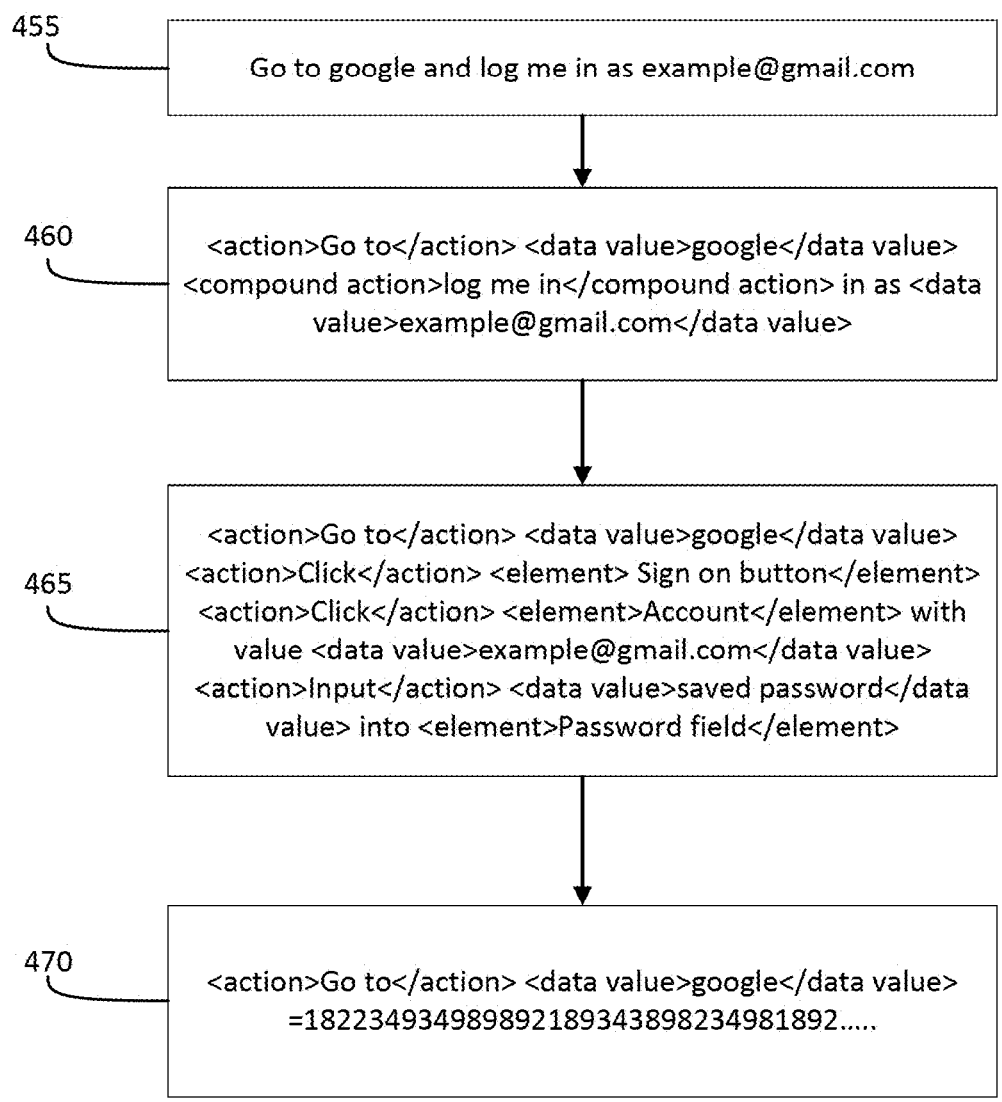
FIG. 5 is an example of outputs generated when, given an example input, part of the method of FIG. 4 is performed.

It should be noted that in some embodiments, the specific steps generated by the electronic processor 200 at block 415 are represented in, for example, a markup language, for example, XML. It should also be noted that, in some embodiments, the specific steps are organized in the order that they are to be performed in to successfully perform the task specified in the general natural language command. In some embodiments, at block 420 each specific step generated by the electronic processor 200 is converted by the electronic processor 200 from markup language to a vector. Block 420 will be described in further detail below with respect to the specific step embedder software 235. An example of the process described in blocks 405-420 of FIG. 4 is illustrated in FIG. 5. At block 455 (corresponding to block 405 of FIG. 4), a general natural language command "Go to google and log me in as example@gmail.com" is received. Block 460 illustrates the result of parsing "Go to google and log me in as example@gmail.com" (performing block 410). Block 465 illustrates the plurality of specific steps generated from the parsed general natural language command (the results of performing block 415). Block 470 illustrates a partial vector resulting from converting the specific step "<action>Go to</action><data value>google</data value>" to a vector (the results of partially performing block 420).

At block 425, the electronic processor 200 accesses the webpage specified in the general natural language command. In some embodiments, accessing the webpage includes displaying the webpage on a display device of a user device that the general natural language command was received from (for example, the display device 320 of the user device 110). At block 430, the electronic processor 200 analyzes the accessed webpage using a second machine learning system (for example, the second machine learning system 220) to identify a GUI element associated with a specific step.

In some embodiments, when the electronic processor 200 executes computer executable instructions included in the specific step embedder software 235 the electronic processor 200 converts the specific step to a vector (as described in block 420). In some embodiments, when the electronic processor 200 executes the computer executable instructions included in the GUI element embedder software 237, the electronic processor 200 converts one or more GUI elements included in the accessed webpage to one or more vectors. When the electronic processor 200 executes computer executable instructions included in the matching software 240, the electronic processor 200 compares the vector associated with the specific step to the one or more vectors associated with one or more GUI elements included in the accessed webpage, to determine the GUI element in the webpage that best matches the specific step.

Figure 6:
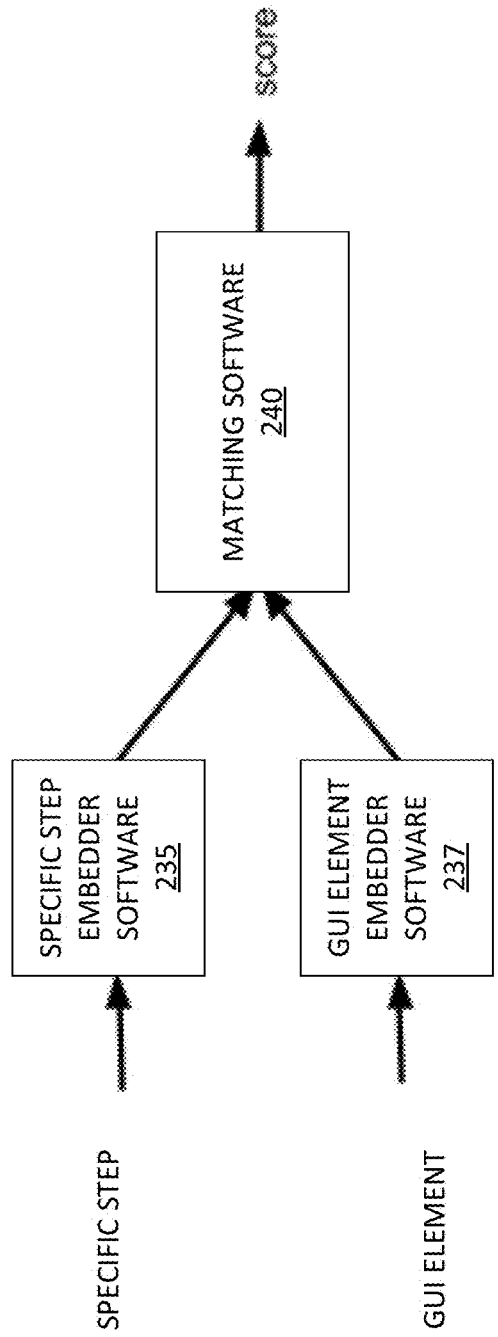
FIG. 6 and FIG. 7 are example diagrams illustrating one or more steps included in the method of FIG. 4.
Figure 7:
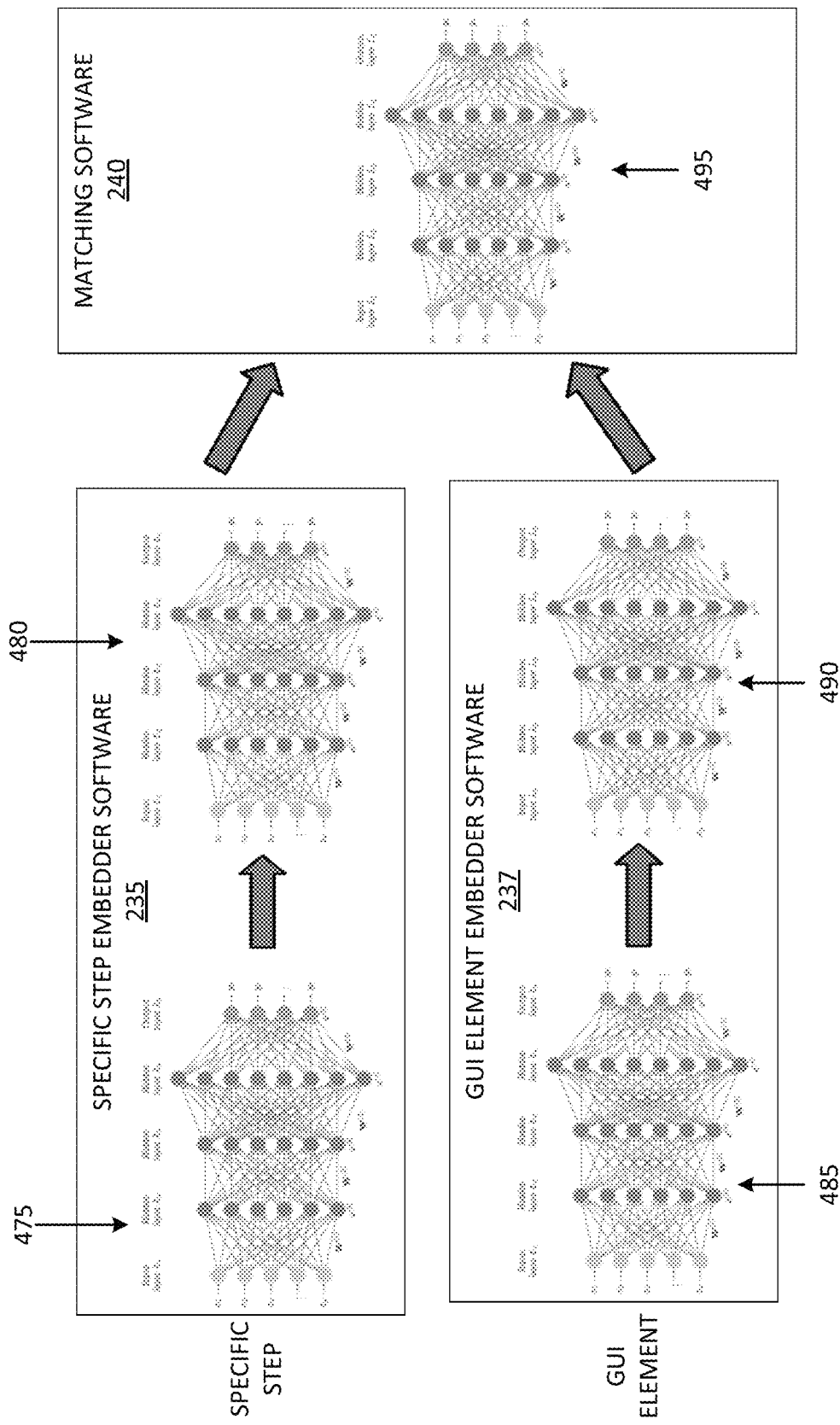

This process is illustrated in FIG. 6 and FIG. 7. As shown in FIG. 6 the outputs of the specific step embedder software 235 and GUI element embedder software 237 are input to the matching software 240. In the example embodiment illustrated in FIG. 7, each of the specific step embedder software 235, GUI element embedder software 237, and matching software 240 include one or more neural networks. For example, the first neural network 475 included in the specific step embedder software 235 converts each word included in a specific step to a vector. A second neural network 280 included in the specific step embedder software 235 takes the average of the word vectors produced by the first neural network 475 as the specific step vector. In some embodiments, one or both of the neural networks included in the specific step embedder software 235 is initialized using vector representations of words, for example, GloVe vectors. In some embodiments, the GUI element embedder software 237 includes a third neural network 485 that converts each attribute of a GUI element and a screenshot of the GUI element to a vector. A fourth neural network 490 included in the GUI element embedder software 237 concatenates the vectors produced by the fourth neural network 490 to create a single GUI element vector and reduce the dimensionality of the GUI element vector to the same dimensionality of the specific step vector. The third neural network 485 and the fourth neural network 490 determine a GUI element vector for each GUI element included in the currently accessed web page. As stated above, the outputs of the specific step embedder software 235 and the GUI element embedder software 237 are sent to the matching software 240. In some embodiments, the second machine learning system 220 concatenates the outputs of the specific step embedder software 235 and the GUI element embedder software 237 and inputs the concatenated outputs to the fifth neural network 495. The matching software 240 includes a fifth neural network 495 that compares the specific step vector to the one or more GUI elements vectors to determine the GUI element in the webpage that best matches the GUI element description in the specific step. For example, the fifth neural network 495 may, for each GUI element vector, output a score indicating a degree to which the GUI vector matches the specific statement vector and the matching software determines the matching GUI element to be the GUI element for which the fifth neural network 495 generated the highest score.

At block 435, the electronic processor 200 performs the specific step (or the action included in the specific step) based on the identified GUI element. Depending on the specific step that the electronic processor 200 performs, a different webpage may be accessed. For example a cart icon (a GUI element) in the webpage, when selected, may cause a new webpage to be accessed and, in some embodiments, displayed. At block 440, the electronic processor 200 determines whether each specific step generated at block 415 has been performed. If there remain specific steps that the electronic processor 200 has not performed, the electronic processor 200 analyzes a webpage using the second machine learning system 220 to identify GUI element associated with a subsequent specific step in the order of specific steps (returns to block 430). After the first specific step has been performed by the electronic processor 200, the webpage that is accessed and analyzed in block 430 may be a different webpage than the webpage specified in the general natural language command. For example, the webpage that is analyzed may be a webpage accessed as a result of a previous specific step being performed.

If each specific step has been performed, the electronic processor 200 determines, at step 445, whether the task specified in the general natural language command has been performed successfully. If the task specified in the general natural language command has not been performed successfully, the electronic processor 200 retrains the first machine learning system 215, the second machine learning system 220, or both.

The process of training the first machine learning system 215 and the second machine learning system 220 will now be described with respect to FIG. 8A, FIG. 8B, FIG. 9, and FIG. 10. The first machine learning system 215 and the second machine learning system 220 may be trained when the training software 225 is executed by the electronic processor 200. Neural networks included in the first machine learning system 215 and the second machine learning system 220 may be trained using backpropagation and an Adam optimizer.

Figure 8A:
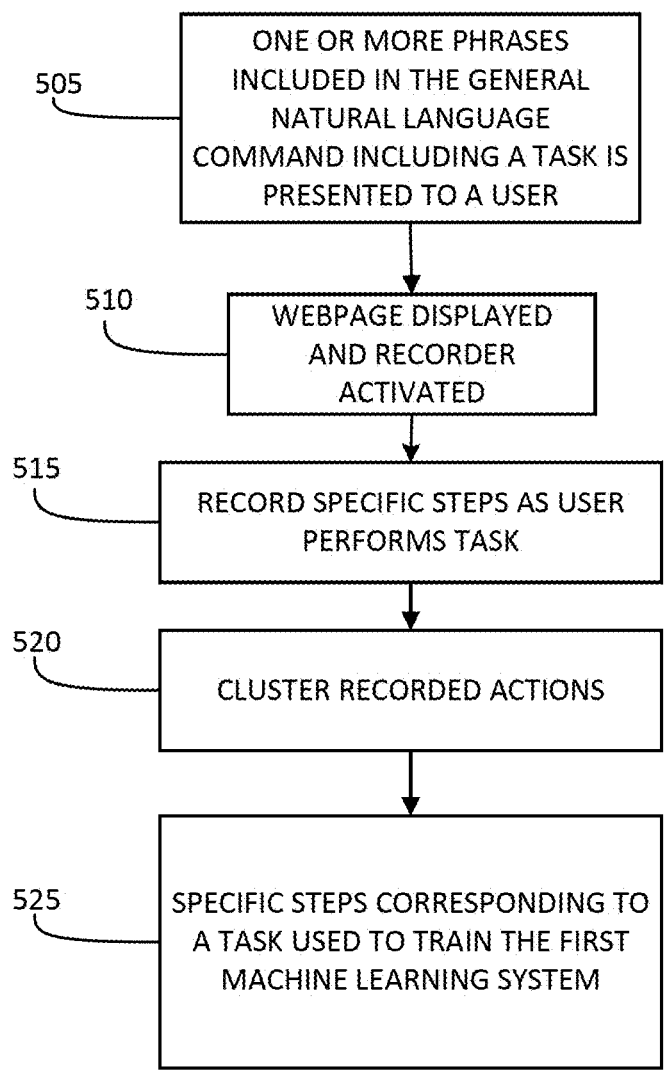

FIG. 8A illustrates an example method 500 for training (and retraining) the first machine learning system 215. More specifically, FIG. 8A illustrates an example method 500 for collecting training data to train one or more machine learning models included in the first machine learning system 215. The method 500 begins at block 505 when the electronic processor 200 sends one or more phrases in natural language (the one or more phrases may be included in a general natural language command) to one or more user devices and a user device (for example, the user device 110) outputs (for example, via the display device 320) the one or more phrases to a user. At block 510, the electronic processor 300 accesses the webpage specified in the general natural language command and begins a recorder (for example, the recorder 330). At block 515, the electronic processor 300 records user actions (specific steps) as the user performs specific steps to complete the task specified in the general natural language command.

The recorder 330 may be, for example, a web browser extension that captures specific steps by monitoring http response headers and injecting JavaScript™ into the website where the task is being performed. Each specific step is associated with a timestamp indicating when the specific step was performed. When executed by the electronic processor 300, the recorder 330 also captures a screenshot of a webpage displayed by the display device 320 when the user performs the specific step and a cropped screenshot of a GUI element that the user interacted with as a part of the specific step. Examples of specific steps that the recorder 330 may capture include are mousedown, message, mouseup, mouseover, mouseout, mouseenter, mouseleave, keydown, keyup, contextmenu, change, blur, focus, mousemove, message, dragstart, drop, verify, scroll, confirm, alert, resize, pageinit, navigate, browserback, browsernext, setCookie, setHTMLStorage, wait, keypress, emailreceive, DBExplorer, fileViewer, smsreceive, apicall, download, customcode, urlchange, escape, click, input, select, radio, check, dragdrop, dragby, hover, a combination of the foregoing, and the like. In some embodiments, the electronic processor 300 associates additional data with the data captured by the recorder 330. The additional data may be, for example, action ID's, data required to replay actions, both, or the like.

At step 520, the electronic processor 300 clusters the specific steps performed by the user based on the timestamps that the specific steps are associated with. Based on the clusters, the electronic processor 300 determines a plurality of specific steps associated with performing a task specified by a phrase. It should be noted that the electronic processor 300 may determine that there are more than one plurality of specific steps associated with performing a task specified by a phrase. It should be noted that, in some embodiments, specific steps may be clustered based on data associated with GUI elements other than timestamps.

At step 525, the electronic processor 300 sends, to the electronic processor 200, a plurality of specific steps performed by the user to complete a task specified by a phrase of the one or more phrases. The specific steps associated with a phrase are used by the electronic processor 200 to train one or machine learning models included in the first machine learning system 215. It should be noted that phrases and specific steps may be in a different format than natural language (for example, a markup language) when they are used to train the first machine learning system 215. It should also be noted that the one or machine learning models included in the first machine learning software 215 may be trained to generate specific steps for phrases that are concatenated. For example, if the electronic processor 300 does not successfully parse a general natural language command into individual phrases, the first machine learning system 215 may be able to successfully generate specific steps for the concatenated phrases. An example of a concatenated phrase is "login to my email account and create a new email."

Figure 9:
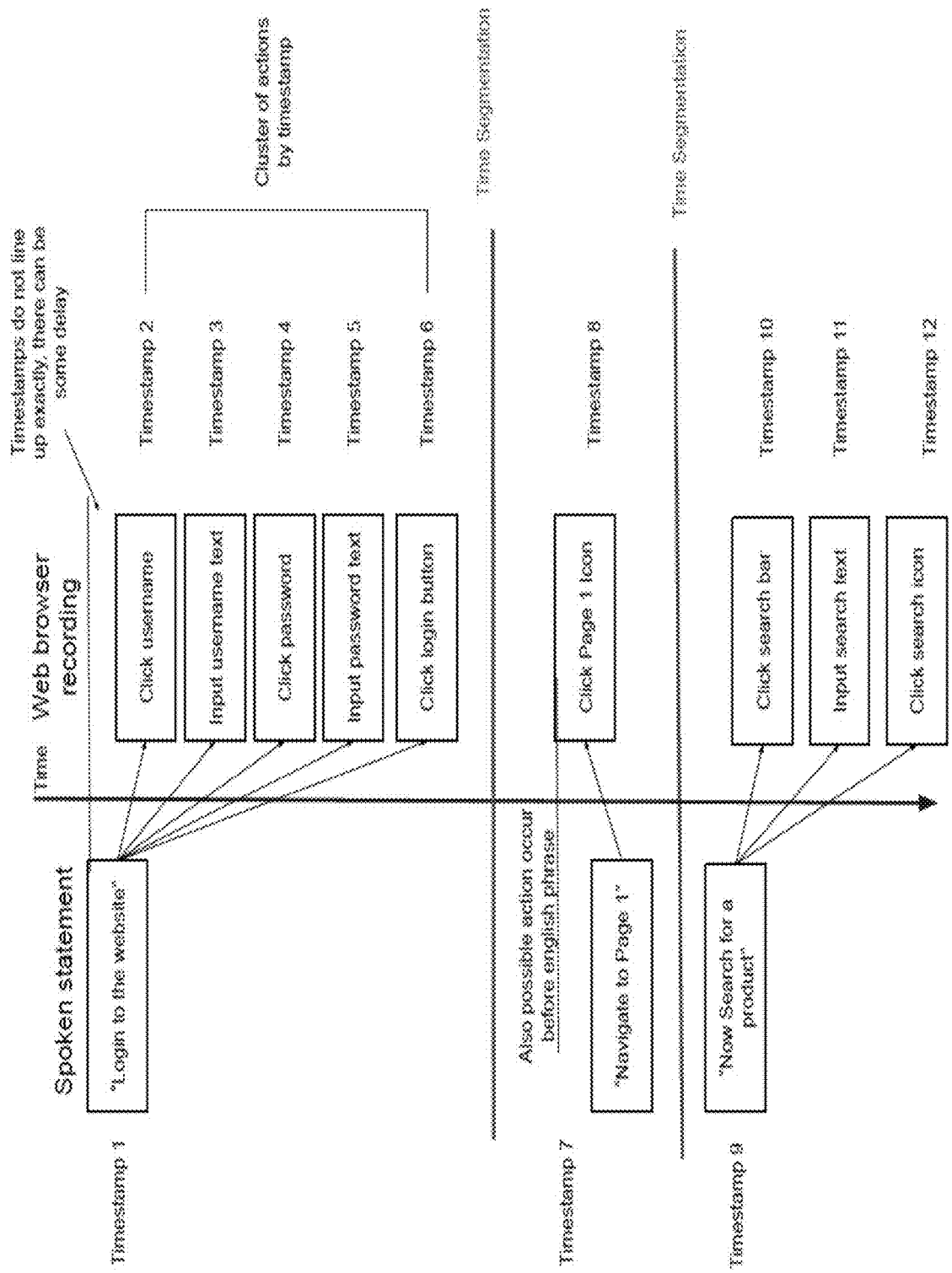
FIG. 9 provides an example diagram illustrating clustered specific steps and their associated phrases according to some embodiments.

In some embodiments, the electronic processor 300 receives a phrase from a user via the input device 315 rather than from the electronic processor 200. FIG. 8B illustrates an example method 530 for training (and retraining) the first machine learning system 215, wherein the electronic processor 300 receives a phrase from a user via the input device 315, for example, a microphone. While the method 530 describes the input device as a microphone it should be noted that the input device 315 may be for example, a keyboard, and the phrase received from the user may be typed. At block 535 the electronic processor 300 opens a web browser and activates the recorder 330. At block 540, the electronic processor 300 receives a phrase specifying a task is received from the input device 315. For example, a user may speak a phrase specifying a task (for example, "logon to the website") into a microphone (the input device 315). When the electronic processor 300 receives the phrase via a microphone, at block 545 the electronic processor 300 converts the spoken phrase included in audio recording to text using a speech to text algorithm. At block 550 (similar to block 515 described above), the electronic processor 300 uses the recorder 330 to capture actions or specific steps that a user performs to complete the task specified in the phrase received via the input device 315. At block 555, the electronic processor 300 clusters specific steps by timestamp and associates the specific steps included in the cluster with a phrase that the electronic processor 300 received at approximately the time that the first specific step in the cluster was performed. In other words, the phrase and the first specific step in the cluster have similar time stamps. FIG. 9 provides an example diagram illustrating clustered specific steps and their associated phrases. It should be noted that, in some embodiments, specific steps may be clustered based on data associated with GUI elements other than timestamps. At block 555, the electronic processor 300 sends, to the electronic processor 200, the plurality of specific steps performed by the user to complete a task specified by a phrase (the cluster of specific steps associated with the phrase). The specific steps associated with a phrase are used by the electronic processor 200 to train one or machine learning models included in the first machine learning system 215. It should be noted that phrases and specific steps may be in a different format than natural language (for example, a markup language) when they are used to train the first machine learning system 215. It should also be noted that the one or machine learning models included in the first machine learning software 215 may be trained to generate specific steps for phrases that are concatenated. For example, if the electronic processor 300 does not successfully parse a general natural language command into individual phrases, the first machine learning system 215 may be able to successfully generate specific steps for the concatenated phrases. An example of a concatenated phrase is "login to my email account and create a new email."

FIG. 10 illustrates an example method 600 for training (and retraining) the second machine learning system 220. More specifically, FIG. 10 illustrates an example method 600 for collecting training data to train one or more machine learning models included in the second machine learning system 220. The method 600 begins at block 605 when the electronic processor 200 sends, to the electronic processor 300, a natural language description of a GUI element and the electronic processor 300 outputs (for example, displays via the display device 320) to a user a natural language description of a GUI element. The electronic processor 200 may also send to the electronic processor 300 an indication of a webpage and the electronic processor 300 access the webpage and displays the webpage to the user and activates the recorder 330. At block 615, the electronic processor 300 receives a selection (for example, via the 315) of GUI element included in the webpage based on the natural language description of the GUI element. At block 620, the electronic processor 300 associates data regarding selected GUI element with the natural language description of the GUI element. The data regarding the GUI element may include, for example, a cropped screenshot of the selected GUI element captured by the recorder 330, HTML code representing the GUI element, location of the GUI element is on the webpage, API calls or actions associated with the GUI element, and the text the GUI element displays, CSS selectors associated with the GUI element, XPaths associated with the GUI element, a combination of the foregoing, or the like. At block 630, the electronic processor 300 sends the GUI element data and its associated natural language description to the electronic processor 200 and the electronic processor 200 uses the GUI element data and its associated natural language description to train the second machine learning system 220 to determine, based on a natural language description of a GUI element, a GUI element included in a webpage. In some embodiments, the natural language description of the GUI element is converted to a vector by a machine learning model, for example, a neural network.

In some embodiments, the above described functionality may be applied to software testing. For example, the general natural language command may be a test case or test plan (for example, "Go to the site, check it's working, and order an emoticon gift to an unknown delivery address") and the specific steps are test case steps (for example, check the correct logo and menu items are shown (Summer, Birthday, Sympathy, Occasions, Flowers, Plants, and Gift Baskets & Food"), search for "emoticon gifts," make sure sensible results appear and click on the first one, check you go to the purchase page, click "Don't know the recipient's delivery address? Click here," enter your details)."

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms, for example, first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various features, advantages, and embodiments are set forth in the following claims.

What is claimed is:

1. A system for performing a task with multiple specific steps given a general natural language command, the system comprising:
    an electronic processor, the electronic processor configured to receive a general natural language command specifying a webpage and a task to perform on a graphical user interface of the webpage;
    using a first machine learning system, generate a plurality of specific steps associated with the general natural language command, wherein each specific step of the plurality of specific steps comprises an action to be performed on an element of the graphical user interface of the webpage;
    perform the task using the plurality of specific steps and a second machine learning system;
    determine whether the task is performed successfully; and
    when the task is not performed successfully:
    retrain the first machine learning system by recording user actions of a user performing the task on the webpage provided by the general natural language command; and/or
    retrain the second machine learning system by displaying a natural language description of a graphical user interface element to a user; recording the user selection of a graphical user element of the webpage; and associating the natural language description of the graphical user interface element with the user selection of the graphical user element of the webpage.

2. The system according to claim 1, wherein the second machine learning system includes one or more neural networks and wherein the electronic processor is configured to perform the task using the plurality of specific steps and a second machine learning system by
    for each of the plurality of specific steps
        converting the specific step including a description of a GUI element to a vector;
        converting one or more GUI elements included in the webpage to one or more vectors;
        comparing the vector associated with the specific step to the one or more vectors associated with the one or more GUI elements included in the webpage, to determine the GUI element in the webpage that best matches the GUI element description included in the specific step; and
        using the one or more GUI elements associated with the specific step, performing an action associated with the specific step.

3. The system according to claim 2, wherein the plurality of specific steps are ordered and wherein, for a first specific step of the plurality of specific steps, the webpage including one or more GUI elements that are converted to vectors is the webpage indicated in the general natural language command and, for subsequent specific steps, the webpage including one or more GUI elements that are converted to vectors is a webpage accessed after an action associated with a previous specific step is performed.

4. A method for performing a task with multiple specific steps given a general natural language command, the method comprising:
    receiving a general natural language command specifying a webpage and a task to perform on a graphical user interface of the webpage;
    using a first machine learning system, generating a plurality of specific steps associated with the general natural language command, wherein each specific step of the plurality of specific steps comprises an action to be performed on an element of the graphical user interface of the webpage;
    performing the task using the plurality of specific steps and a second machine learning system;
    determining whether the task is performed successfully; and
    when the task is not performed successfully:
    retraining the first machine learning system by recording user actions of a user performing the task on the webpage provided by the general natural language command; and/or
    retraining the second machine learning system by displaying a natural language description of a graphical user interface element to a user; recording the user selection of a graphical user element of the webpage; and associating the natural language description of the graphical user interface element with the user selection of the graphical user element of the webpage.

5. The method according to claim 4, wherein retraining the first machine learning system, second machine learning system, or both includes sending one or more phrases to a plurality of user devices;
    for each of the one or more one or more phrases;
    collecting data as users of the user devices perform the task specified by the phrase; and
    using the collected data, generating a plurality of specific steps associated with the phrase; and retraining the first machine learning system using the plurality of specific steps generated using the collected data.

6. The method according to claim 4, wherein the second machine learning system includes one or more neural networks and wherein performing the task using the plurality of specific steps and a second machine learning system includes for each of the plurality of specific steps converting the specific step including a description of a GUI element to a vector;

converting one or more GUI elements included in the webpage to one or more vectors;

comparing the vector associated with the specific step to the one or more vectors associated with the one or more GUI elements included in the webpage, to determine the GUI element in the webpage that best matches the GUI element description included in the specific step; and using the one or more GUI elements associated with the specific step, performing an action associated with the specific step.

7. The method according to claim 6, wherein the plurality of specific steps are ordered and wherein, for a first specific step of the plurality of specific steps, the webpage including one or more GUI elements that are converted to vectors is the webpage indicated in the general natural language command and, for subsequent specific steps, the webpage including one or more GUI elements that are converted to vectors is a webpage accessed after an action associated with a previous specific step is performed.

8. The system of claim 1, wherein the general natural language command is provided in typed or text form.

9. The system of claim 1, wherein the task is a web-based task.

10. The system of claim 1, wherein the electronic processor is further configured to access the webpage.

11. The system of claim 1, wherein the electronic processor is further configured to display the webpage.

12. The method of claim 4, wherein the general natural language command is provided in typed or text form.

13. The method of claim 4, wherein the task is a web-based task.

14. The method of claim 4, further comprising accessing the webpage.

15. The method of claim 4, further comprising displaying the webpage.

* * * * *

UNITED STATES PATENT AND TRADEMARK OFFICE
CERTIFICATE OF CORRECTION

| | |
|---|---|
| PATENT NO. | : 11,645,467 B2 |
| APPLICATION NO. | : 16/595356 |
| DATED | : May 9, 2023 |
| INVENTOR(S) | : Jonathon Seaton and Tamas Cser |

It is certified that error appears in the above-identified patent and that said Letters Patent is hereby corrected as shown below:

In the Claims

Claim 5, Column 12, Line 63 reads:
"for each of the one or more one or more phrases;"

Whereas it should read:
"for each of the one or more phrases;"

Signed and Sealed this
Twentieth Day of June, 2023

Katherine Kelly Vidal
*Director of the United States Patent and Trademark Office*